Figure 1:
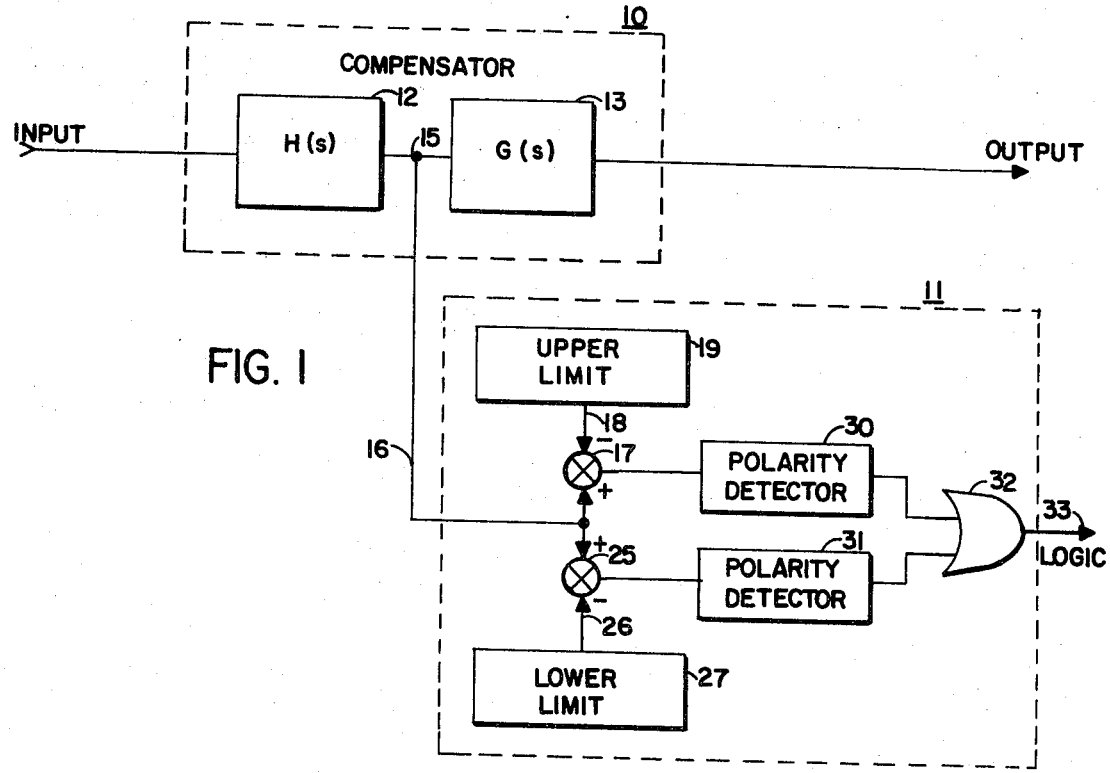

United States Patent

Sawamura

[15] 3,643,073
[45] Feb. 15, 1972

[54] TRANSFER FUNCTION MONITORING APPARATUS

[72] Inventor: Robert T. Sawamura, Minneapolis, Minn.
[73] Assignee: Honeywell Inc., Minneapolis, Minn.
[22] Filed: Sept. 18, 1967
[21] Appl. No.: 668,505

[52] U.S. Cl............................235/150.2, 235/197, 318/604, 318/635, 244/77 D, 307/92, 324/57 FP, 333/70 R
[51] Int. Cl............................G06g 7/70, H03h 7/02
[58] Field of Search..............235/150.2, 151.2; 307/92; 244/77 D, 77 DZ; 73/384; 324/57; 318/604, 608, 683

[56] References Cited

UNITED STATES PATENTS

| Re 25,491 | 12/1963 | Lee et al.................................244/77 |
| 3,057,584 | 10/1962 | Bretoi....................................244/77 |
| 3,063,662 | 11/1962 | Rotier....................................244/77 |
| 3,079,108 | 2/1963 | Falkner et al............................244/77 |
| 3,221,151 | 11/1965 | Cattel et al............................235/150.1 |
| 3,362,658 | 1/1968 | Ito et al...............................235/150.2 X |
| 3,242,736 | 3/1966 | Winter et al..............................73/384 |
| 3,408,024 | 10/1968 | Iverson....................................244/77 |
| 2,768,331 | 10/1956 | Cetrone................................318/18 X |
| 2,946,943 | 7/1960 | Nye et al..............................318/18 X |
| 3,032,711 | 5/1962 | Gilchrist.................................324/57 |
| 3,266,753 | 8/1966 | Gaylor.................................318/18 X |

*Primary Examiner*—Malcolm A. Morrison
*Assistant Examiner*—Felix D. Gruber
*Attorney*—Roger W. Jensen, Charles J. Ungemach and Bruce C. Lutz

[57] ABSTRACT

A sensitive control system monitor for control systems using band rejection or notch filters. An inverse notch filter reconstructs the input signal to the notch filter and a comparator measures the difference between a lagged input signal and the reconstructed input signal to provide a logic output when the time rate of change of the input signal exceeds a predetermined threshold.

10 Claims, 8 Drawing Figures

PATENTED FEB 15 1972

3,643,073

SHEET 1 OF 3

INVENTOR.
ROBERT SAWAMURA

BY Bruce C Lutz

ATTORNEY

TRANSFER FUNCTION MONITORING APPARATUS

BACKGROUND

This invention pertains to condition control apparatus and more specifically to monitoring circuitry to measure the performance of elements of a control system.

State of the art control systems and particularly high performance flight control systems have increased "fail safe" monitor circuit demands. The use of high-gain feedback networks to improve vehicle performance characteristics necessitates the use of notch filters to increase the aeroelastic stability margin at certain vehicle resonant frequencies. The limitations in classical monitors are particularly apparent when bending mode frequencies are attenuated with high-Q, deep-notch filters. Using prior art monitoring techniques, it is impossible for a monitor to detect age changes in the transfer function of the notch filter.

This inventive concept was developed in response to a need for a monitoring system for use with a control system employing notch filters. The inventive concept permits the measurement of percentage changes in the transfer function of the notch filter.

The inventive concept may be applied to a flight control system to provide a logic output when the system transfer function deviates from its mechanized characteristics. If rate inputs are applied to the system notch filter and an additional filter network is used in conjunction with the inverse monitoring techniques herein described, a logic signal may be provided by the comparison monitor, indicating that the craft has exceeded a predetermined acceleration or g-limit and action must be taken to prevent structural damage to the aircraft. A g-limiter is necessary in the event that the stability compensation provided by the notch filter is insufficient to assure adequate gain and stability margins.

DESCRIPTION

This invention is a monitor which continually measures the performance of a control system notch filter and also provides monitoring of the angular acceleration of the aircraft. The signal output of the notch filter is passed through a filter network which has a transfer function which is the inverse of the notch filter transfer function. Thus, the input signal, after being passed through the notch filter and the inverse notch filter, has a form identical to that of the input signal if there is a perfect match between the characteristics of the inverse notch filter and the notch filter. Degradation of the performance of the notch filter will result in a difference developing between the unmodified input signal amplitude and the input signal amplitude as modified by the action of the notch filter and the inverse notch filter. A standard differential comparator may be used to detect the difference between the modified and the unmodified difference signal and a level detector may be used to provide a logic output when the difference between the two signals exceeds a predetermined threshold value.

An acceleration limit monitor may be mechanized by placing a "weighting" filter in series with a rate signal modified by the notch filter and the inverse notch filter. When this signal is compared with the unmodified input signal, an error signal results which is dependent upon the deviation between the control system notch filter characteristics and the inverse notch filter characteristics and also upon the acceleration of the aircraft.

It is an object of this invention to provide a unique control system monitoring technique which provides an output which is a measure of the difference between the transfer function of the control system and a filter having a transfer function equal to the inverse of the control system transfer function.

It is a further object of this invention to provide for a control system containing notch filters, a monitor circuit which provides an output indicating the percentage deviation of the notch filter from the proper characteristics.

Figure 2:
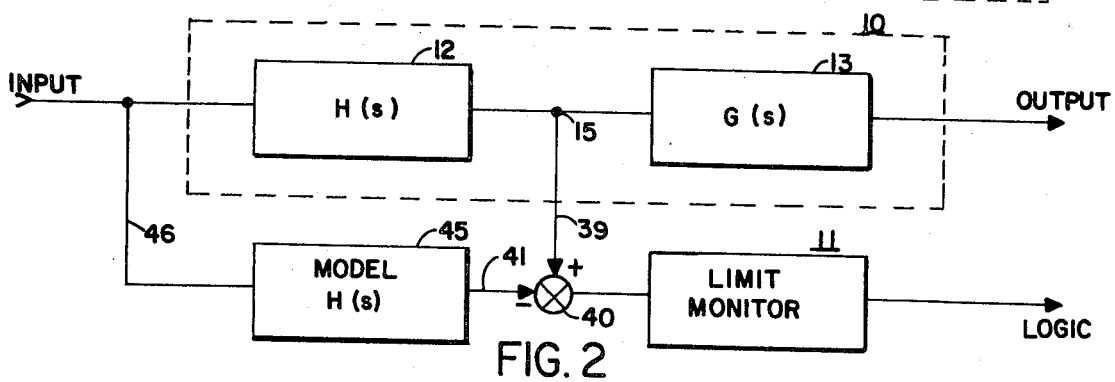
Figure 3:
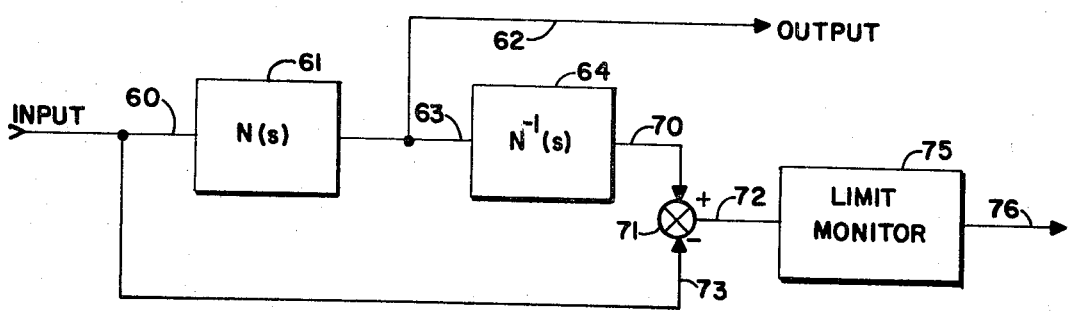
Figure 4:
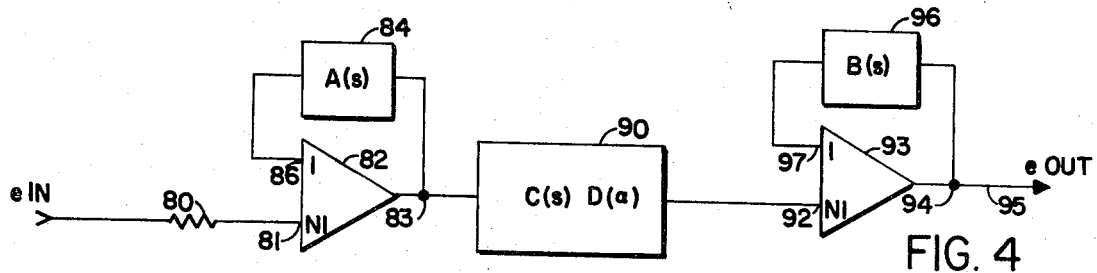
Figure 5:
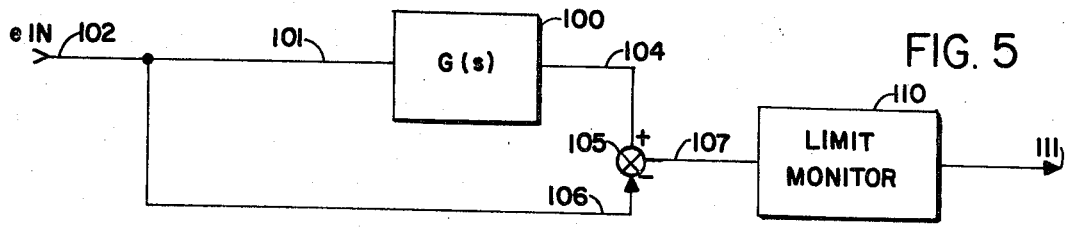
Figure 6:
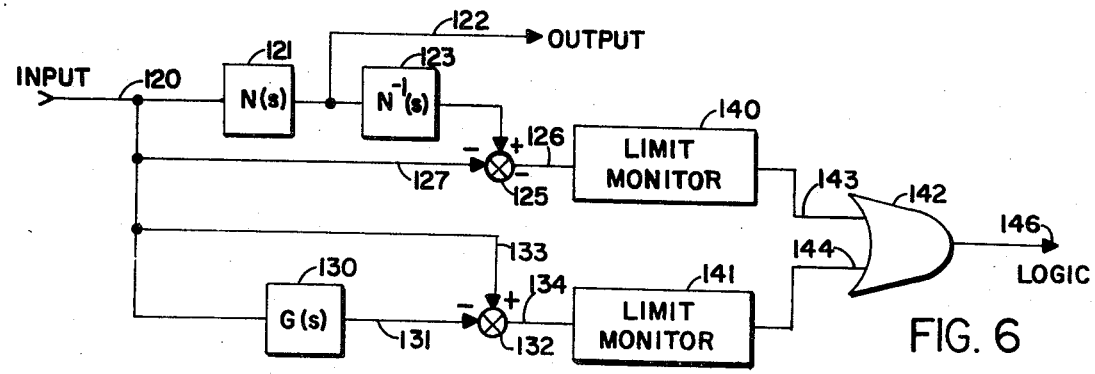
Figure 7:
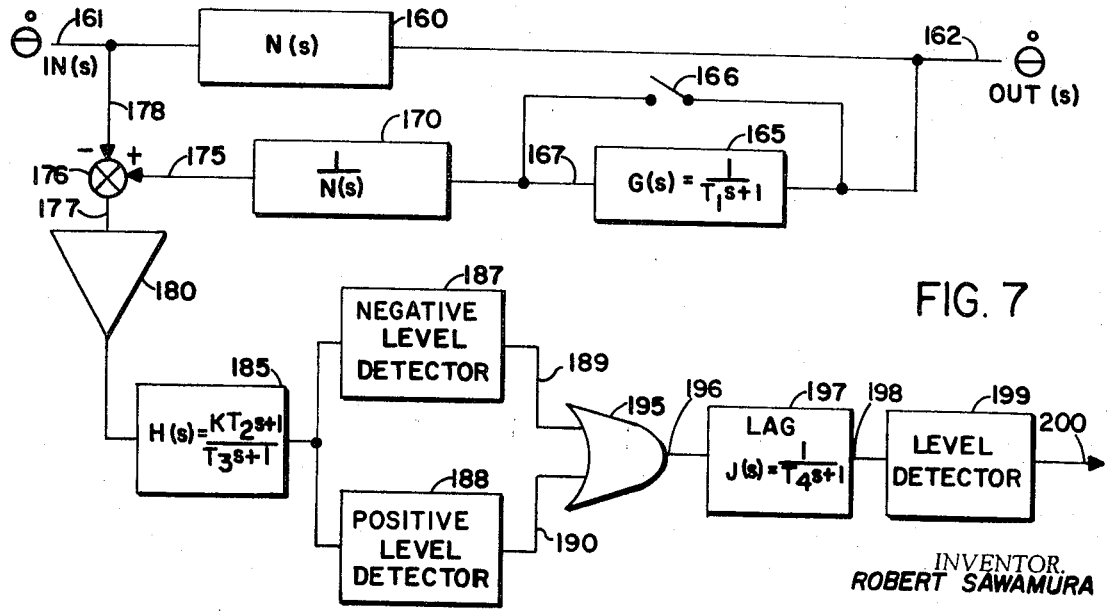
Figure 8:
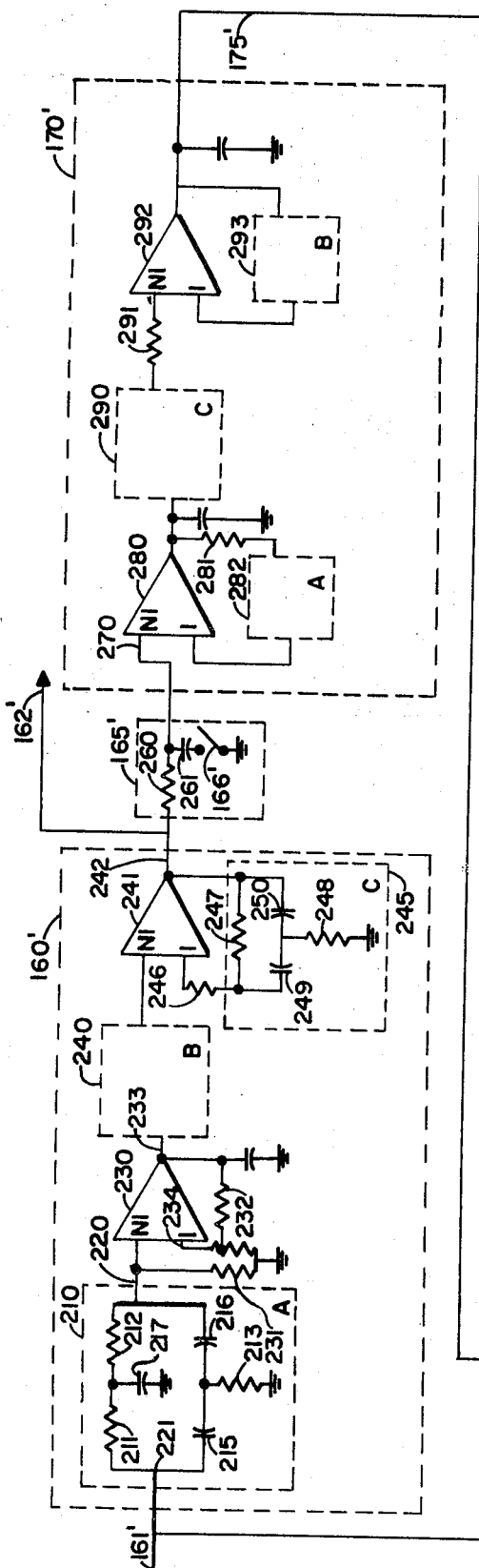
Figure 8:
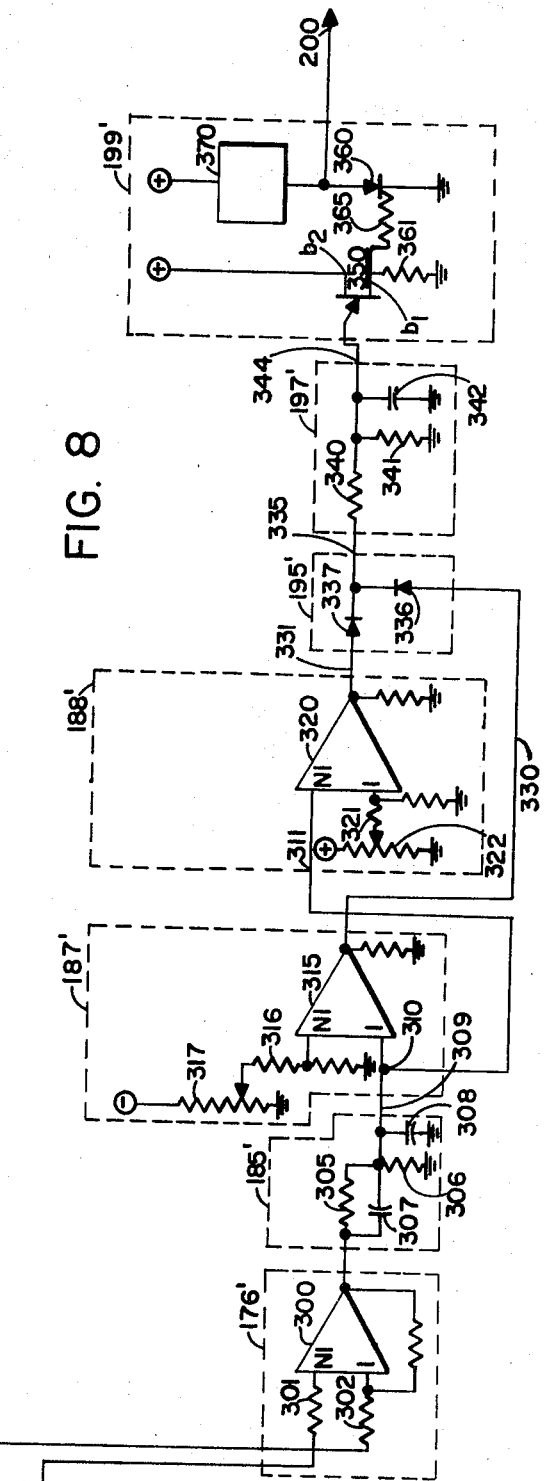

Further objects and advantages will become apparent from a reading of the specification and claims in conjunction with the drawings wherein:

FIG. 1 is a block diagram of a prior art simple limit monitor.
FIG. 2 is a block diagram of a prior art comparison monitor.
FIG. 3 is a block diagram of an inverse monitor.
FIG. 4 is a block diagram of a partitioned inverse monitor.
FIG. 5 is a block diagram illustrating the use of a weighting function.
FIG. 6 is a block diagram of a g-limit and inverse notch monitor.
FIG. 7 is a block diagram of an alternate mechanization inverse notch and acceleration limit monitor.
FIG. 8 is a schematic of an inverse notch and acceleration limit monitor.

Control system monitors differentiate between acceptable and undesirable control system conditions by sensing the characteristics of input signals, output signals, error voltages, etc.; all of which may aptly be called state variables. A monitor may compare state variables to rival state variables or to bounded reference constraints; thereby generating an intelligence for controlling logic switching functions. Monitors effectively recognize parameter variations, originating from component failures or fatigue, and can prevent controller operation beyond prescribed limits.

Classical or common monitors have met the requirements of past control systems, and not until the advent of high-gain, notched-bending-mode control systems did deficiencies inherent to the classical apparatus become apparent. A "measure of goodness" of a control system is defined as a performance index; and a significant monitoring performance index is the sensitivity of the monitor to minute deviations from a desired system response. The lack of monitor sensitivity is the major consideration in proposing a unique monitor configuration in lieu of the classical models.

For the remainder of this specification the term "transfer function" shall be interpreted to represent the ratio of the signal at an output of a network segment to the signal at an input of the network segment. The transfer function may be expressed as the ratio of two polynomials of the Laplacian operator $s$.

In FIG. 1, a condition control means or compensator means 10 is operated in conjunction with a limit monitor 11. Condition control means 10 has a known transfer function which may be divided into a portion 12 having a transfer function $H(s)$ and a portion 13 having a transfer function $G(s)$. A state variable X may be derived at a point of connection 15 between transfer functions 12 and 13. The state variable X is passed through a conductor 16 to the limit monitor 11. A signal on conductor 16 is compared by a comparator means 17 with a signal on a conductor 18 which was generated by an upper limit signal producing means 19. The signal on conductor 16 is also compared by a comparator 25 to a signal on a conductor 26 which is produced by a lower limit signal producing means 27. The outputs of comparator means 17 and 25 are passed respectively through polarity detectors 30 and 31 to a logic OR-gate 32. A logic OR gate as used herein, produces a positive output signal when a positive input signal is applied to any input. A logic output 33 is produced by the OR-gate 32 whenever level detector 30 or 31 is producing an output.

In FIG. 2 the prior art mechanization of a comparison monitor is shown. The condition control means 10 and limit monitor 11 are as shown in FIG. 1. A state variable X is obtained at the point of connection 15 between transfer functions 12 and 13 and is conducted on conductor 39 to a comparator means 40 which provides an output to the limit monitor 11. The provided output is equal to the signal on the conductor 39 minus the signal on a conductor 41. The signal on the conductor 41 is produced by a filter 45 which has a transfer function modeled from the transfer function $H(s)$ of portion 12. Filter 45 receives its input from a conductor 46 which is connected to the input of the condition control means 10.

In FIG. 3 an input on a conductor 60 is supplied to a condition control means 61 which has a transfer function N(s) which may possibly be the transfer function of a band rejection or notch filter. The output of the condition control means 61 is transmitted through a conductor 62 to the output of the flight control system and is also passed through a conductor 63 to a filter means or inverse filter 64 which has a transfer function which is the Laplacian inverse of the transfer function 61. The Laplacian inverse of a particular transfer function may be obtained by interchanging the numerator and denominator polynomials comprising the transfer function. The output of the inverse filter 64 is carried by a conductor 70 to a summing means 71 which provides an output signal on a conductor 72 equal to the difference between the signal on the conductor 70 and the signal on a conductor 73 which is connected to the condition control means input. The output of the summing means 71 is transmitted by the conductor 72 to a limit monitor 75 which provides a logic output 76 when predetermined limits are exceeded.

In FIG. 4 a condition control means input signal is applied through a resistor 80 to a noninverting input 81 of a differential amplifier 82. An output 83 of the differential amplifier 82 is connected through a feedback transfer function A(s) 84 to an inverting input 86 of the amplifier 82. The output 83 of amplifier 82 is connected through a filter 90 which has a transfer function equal to $C(s)D(\alpha)$ where $\alpha$ is a variable controlled by an external means not shown. The output of filter 90 is connected to a noninverting input 92 of a differential amplifier 93 whose output 94 is connected through a feedback transfer function B(s) 96 to an inverting input 97 of the amplifier 93 and to the condition control means output 95.

In FIG. 5 a filter means 100 having a transfer function G(s) receives an input on conductor 101 which is connected to a signal input 102. The output of filter 100 is passed on a conductor 104 to a summing means 105 which produces an output equal to the difference between the signal on the conductor 104 and the signal on a conductor 106 which is connected to the signal input 102. The output of the summing means 105 is conducted on a conductor 107 to a limit monitor 110 which produces a logic output at a terminal 111.

In FIG. 6 the control system input signal at 120 is conducted through a control system transfer function 121 to a control system signal output means 122 and to a filter 123 which has a transfer function which is equal to the inverse of the transfer function of the control system 121. The output of a filter means 123 is conducted to a summing means 125 which has an output on a conductor 126 which is equal to the difference between the signal at the output of the filter means 123 and a second signal transmitted on a conductor 127 which is connected to the control system input means 120. The signal from the input means 120 is passed through filter 130 and through a conductor 131 to an input of a summing means 132 which receives a second signal from input means 120 through a conductor 133 and produces an output on a conductor 134 which is equal to the difference between the signal on the conductor 133 and the second signal transmitted on conductor 131. The signals on conductors 126 and 134 are respectively connected to limit monitors 140 and 141 whose outputs are connected to an OR-gate 142 through conductors 143 and 144. If a signal is present on the conductor 143 or the conductor 144, a logic output will be present at an output terminal 146.

In FIG. 7, a flight control system 160 has a transfer function N(s) which may include several notch or band rejection filters in cascade. The control system 160 is connected to a signal input 161 and produces a control output at 162. The control system output at 162 is passed through a filter 165 which has a transfer function of the form:
$$G(s) = 1/T^1 s + 1 \qquad (1)$$
A switch 166 is connected between the control system output 162 and an output 167 of the filter 165. An inverse filter 170 which has a transfer function equal to the inverse of the transfer function of the control system 160, receives its input from the output 167 of filter 165. The output of the inverse filter 170 is connected through a conductor 175 to a summing means 176 which produces an output on a conductor 177 which is equal to the difference between the signal on the conductor 175 and the signal on a conductor 178 which is connected to the control system input 161. Conductor 177 is connected through an amplifier 180 to a lead-lag network 185 which has a transfer function of the form:

$$H(s) = \frac{K(T_2 s + 1)}{T_3 s + 1} \qquad \text{where } T_2 > T_3 \qquad (2)$$

The output of the lead-lag filter 185 is connected to a negative level detector 187 and a positive level detector 188 which provide outputs on conductors 189 and 190 respectively to an OR-gate 195 producing an output on terminal 196 when a signal is present on either conductor 189 or conductor 190. The output at terminal 196 of OR-gate 195 is passed through a lag network 197 which has a transfer function of the form:
$$J(s) = 1/T^4 s + 1 \qquad (3)$$
A signal output 198 of the lag device 197 is passed to a level detector 199 which has a logic output 200.

In FIG. 8 the elements shown in the blocks of FIG. 7 are enclosed in dotted lines and labeled with the same numbers used in FIG. 7 with the addition of "prime marks." The control input is applied to an input terminal 161' of a condition control means 160'. The input signal is conducted from the input terminal 161' to a filter means 210 which is comprised of resistors $R_1$ 211, $R_2$ 212 and $R_3$ 213 as well as capacitors $C_1$ 215, $C_2$ 216, and $C_3$ 217. The resistors and capacitors are connected as shown in a "Twin-T" filter. Such a filter has a transfer function equal to the ratio of the output voltage at an output terminal 220 to the input voltage at an input terminal 221. Using conventional Laplace transform techniques, the transfer function for a Twin-T filter such as filter 210 may be expressed as:

$$N(s) = \frac{a_0 + a_1 s + a_2 s^2 + a_3 s^3}{b_0 + b_1 s + b_2 s^2 + b_3 s^3} \qquad (4)$$

where the constants are related to the circuit elements as follows:

$$a_0 = R_4 \qquad (5)$$
$$a_1 = (C_1 + C_2) R_3 R_4 \qquad (6)$$
$$a_2 = C_1 C_2 R_3 R_4 (R_1 + R_2) \qquad (7)$$
$$a_3 = R_1 R_2 R_3 R_4 C_1 C_2 C_3 \qquad (8)$$
$$b_0 = R_1 + R_2 + R_4 \qquad (9)$$
$$b_1 = C_3 R_1 R_4 + C_2 R_4 (R_1 + R_2) + R_3 R_4 (C_1 + C_2) + R_1 R_2 C_3 + R_3 (R_1 + R_2)(C_1 + C_2) \qquad (10)$$
$$b_2 = R_1 R_2 R_4 C_2 C_3 + R_1 R_3 R_4 C_3 (C_1 + C_2) + C_1 C_2 R_4 R_3 (R_1 + R_2) + R_1 R_2 R_3 C (C_1 + C_2) \qquad (11)$$
$$b_3 = R_1 R_2 R_3 R_4 C_1 C_2 C_3 \qquad (12)$$

By selecting appropriate values of the constants for equation (4), a filter may be mechanized having a transfer function which has an amplitude the logarithm of which resembles a notch when plotted versus the logarithm of the input frequency. The output 220 of the notch filter 210 is connected to an input of a summing amplifier 230 and also through a resistor $R_4$ 231 to ground. The summing amplifier 230 has a feedback resistor $R_5$ 232 connected between an output 233 and an inverting input 234. The output 233 of the amplifier 230 is connected to a notch filter 240 which has the same general configuration as the notch filter 210 but may have different values of resistance and capacitance. The output of the notch filter 240 is connected to the noninverting input of amplifier 241 which delivers an output from terminal 242 to the condition control output 162' and also to a feedback network or filter 245. Feedback 245 is a "bridged-T" filter and is connected to the inverting input of amplifier 241 through resistor $R_6$ 246. Filter 245 is comprised of resistors $R_7$ 247 and $R_8$ 248 as well as capacitors $C_4$ 249 and $C_5$ 250 arranged as shown. Given the values of resistance and capacitance, the transfer function for the filter 245 may be derived.

The output of condition control circuit 160' is also connected to a filter 165'. Filter 165' is comprised of resistor $R_9$ 260, capacitor $C_6$ 261 and a switch 166' arranged as shown. This filter operates as a simple lag network when switch 166' is in the closed position and as a series resistor when switch 166' is in the open position.

The output of filter 165' is connected to an input 270 of an inverse filter 170'. The input 270 of the inverse filter 170' is connected to the noninverting input of an amplifier 280 whose output is connected through a resistor $R_{10}$ 281 and a notch filter 282 to the inverting input of amplifier 280. The output of the amplifier 280 is connected through a series connection of a filter 290 and the resistor 291 to a noninverting input of an amplifier 292. The output of the amplifier 292 is connected through a filter 293 to an inverting input of the amplifier 292. The output of operational amplifier 292 is connected to a conductor 175' which transmits it to a summing device 176'.

The summing device 176' is comprised of an amplifier 300 which receives a noninverting input through a resistance means 301 from the condition control system input 161' and receives an inverting input through a resistor 302 from the conductor 175'. The output of the amplifier 300 is connected to a lead-lag filter 185' which is comprised of resistors 305 and 306 and capacitors 307 and 308 connected as shown. The output of the lead-lag network 185' is connected to a conductor 309. The conductor 309 is connected to an input 310 of a negative signal monitor 187' and to an input 311 of a positive signal monitor 188'. The negative signal monitor 187' contains a differential amplifier 315 which has an inverting input connected to the negative signal monitor input terminal 310 and a noninverting input connected through a resistor 316 to the wiper of an adjustable resistor 317 which is connected to a negative power supply and ground. The positive signal monitor 188' contains differential amplifier 320 which receives a noninverting input from the positive signal monitor input terminal 311 and an inverting input from a resistor 321 which is connected to the wiper of a potentiometer 322 which is connected to a positive power supply and ground. The outputs of amplifiers 315 and 320 are connected respectively through conductors 330 and 331 to an OR-gate 195'. The OR-gate 195' is comprised of diodes 336 and 337 the anodes of which are connected respectively as shown to conductors 330 and 331. The output 335 of the OR-gate 195' is taken from the common cathodes of diodes 336 and 337.

The output 335 of OR-gate 195' is transmitted to a lag network 197'. The lag network 197' is comprised of resistors 340 and 341 and a capacitor 342 connected as illustrated. The output 344 of lag network 197' is connected to a level detector 199'. The level detector 199' is comprised of a unijunction transistor 350 and a silicon control rectifier or SCR 360. The unijunction transistor 350 has its $b_1$ terminal connected through a resistor 361 to ground and its $b_2$ terminal connected to the positive power supply. The emitter of unijunction transistor 350 is connected to the output 344 of lag filter 197'. The $b_1$ terminal of unijunction transistor 350 is connected through a resistor 365 to a gate of SCR 360. The cathode of SCR 360 is grounded and the anode is connected to logic output terminal 200 and also through a logic load 370 to a positive source of DC voltage. The logic load 370 may be a relay coil or an indicator lamp.

OPERATION

A brief summary of prior art monitoring circuits clarifies their lack of sensitivity in certain applications. The monitor configuration of FIG. 1 senses excursions of a control condition or state variable X, beyond prescribed limits. The state variable X is derived from terminal 15 of the control system 10 and is transmitted on conductor 16 to summing means 17 and 25 of the limit monitor 11. The summing means 17 receives a signal from the upper limit circuit 19 and the signal from the conductor 16 transmitting an output signal to the polarity detector 30 which is equal to the difference between the signal from the upper limit circuit and the state variable X. When the state variable X has a magnitude larger than the upper limit signal, the polarity of the voltage generated by the summing means 17 will be reversed causing the polarity detector 30 to provide an output signal to the OR-gate 32. The action of summing means 25 is similar to that of summing means 17 with the output of summing means 25 changing sign when the state variable X is more negative than the signal generated by the lower limit circuit 27. The change in polarity of the signal transmitted from the summing means 25 to the level detector 31 causes the polarity detector 31 to apply a signal to the OR-gate 32. A signal from either the polarity detector 30 or the polarity detector 31 will cause an output at terminal 33 of OR-gate 32.

FIG. 2 is a block diagram of another type of prior art monitoring circuit, the comparison monitor. In this circuit the input signal is transmitted to the control system 10 and to a filter 45 which has a transfer function equal to the transfer function $H(s)$ of a portion 12 of the control system 10. Summing means 40 provides a comparison between the state variable X as modified by transfer function $H(s)$ and the state variable $X_1$ as modified by the filter 45. A limit monitor 11 having circuit detail as in FIG. 1 is used to provide a logic output when the difference between the X and $X_1$ signals exceeds predetermined limits. Thus the single channel monitor compares a state variable with a psuedostate variable generated by a model network such as 45. The difference signal is observed by the limit monitor 11 and acceptable differences are determined by the boundary constraints of the limit monitor; limits inside worst-case physical and environmental tolerances of the system being controlled are usually prohibited.

The shortcomings of both forms of prior art monitor circuits become apparent when a monitor is required to detect percentage changes in the transfer function of a control system. The problem is best illustrated by selecting a transfer function $H(s)$ for the control system portion 12 having a notch filter characteristic such as:

$$H(s) = \frac{s_2 + 2s + 256}{s_2 + 32s + 256} \quad (13)$$

A transfer function such as the above has a transfer function at most frequencies of 0 db., but for a limited frequency band, the filter has over 15 db. attenuation.

Assume that a notch filter transfer function $H(s)$ as in equation (13) is descriptive of elements 12 and 45 of FIG. 2. If the transfer function of the element 12 is modified by a gain increase of 6 db., a DC input of 10 volts peak applied to elements 12 and 45 will produce an X output at terminal 15 of 20 volts DC and an $X_1$ output on conductor 41 of 10 volts DC. Thus the output of the summing device 40 will be equal to 10 volts DC if there is a 6 db. gain excess in the transfer function of the control system portion 12. At 2.51 Hz., the notch filter provides an extremely high attenuation of the input signal. For a 10 volt peak, 2.51 Hz. input, the X output at 15 will be equal to 0.80 volts peak while the $X_1$ output on conductor 41 will be equal to 0.63 volts peak. Thus for the same 6 db. difference between the transfer function of the control system 10 and the model 11, the error voltage from the summing means 40 is equal to 0.17 volts peak. It is apparent that a comparison device used to detect the 6 db. difference between the two transfer functions must be frequently dependent so that the 10 volt difference in the DC response will provide the same measure of deviation between the two transfer functions as the 0.17 volt difference measured at 2.51 Hz.

The example of the previous paragraph was simplified by assuming detection of a constant 6 db. gain increase. In an actual system design it may be desirable to incorporate decreasing monitor sensitivity for frequencies displaced from the notch frequency. This is not an unreasonable requirement since the notch filter characteristics at frequencies near the notch frequency give more weight to component variations than they do to characteristics which are further displaced from the notch frequency. Of course, the system gain margin must still determine the maximum gain margin to be allowed by the monitor network. To further illustrate the deficiencies of the prior art techniques consider an example wherein the H(s) notch characteristics are the same as in the previous example. The system design requirements require the comparison monitor to detect a plus 15 db. gain increase at 2.51 Hz. and a 2.5 db. increase at 1 Hz. For the above requirements and a plus 10 volt input, the level detector must detect at 5.95 volt peak error at 1 Hz. and a 3.54 volt peak at 2.51 Hz. It is obvious that the prior art monitoring circuit of FIG. 2 will not be adequate to monitor a system with such requirements. The deficiencies of the comparison monitor of FIG. 2 are also apparent in the level monitor of FIG. 1. Unless the system analysis permits a constant level monitor, the present monitors are inadequate for systems having restrictions even as simplified above.

In order to eliminate the frequency dependence of the error signal, the filter 64 is added serially with the transfer function of the control system 61 as shown in FIG. 3. The filter 64 receives the error voltage on conductor 63 and produces an output on conductor 70 which is equal to the input on conductor 60 if the transfer function of filter 64 is the exact inverse of the transfer function of the control system 61. The voltage on the conductor 72 is equal to the difference between the reconstructed input signal on conductor 70 and the unmodified signal on the conductor 73. The difference voltage is not frequency dependent and the limit monitor 75 will respond to percentage output errors due only to variations in the transfer function of the control system 61.

Monitor operation depends upon the probability that similar failures of the system notch filter 61 and the monitor notch filter 64 will not occur simultaneously. Catastrophic similar failures are usually "hard-over" because of failure of active elements. The term "hard-over" as used herein refers to a control system failure in which an element in the control loop has an output which remains in a high output condition. Such hard-over failures may be detected with simple designed hard-over monitors augmenting the inverse monitor.

The synthesis of a filter having a transfer function which is the inverse of a given transfer function is a known technique. If one is given a shaping network with a transfer function N(s), its inverse transfer function is mechanized by inserting the network in the feedback path of a high gain operational amplifier. However, if the shaping network for which the inverse is desired utilizes several isolation amplifiers which are permitted to attenuate beyond some predetermined high frequency at a rate of −20 db./decade, the total inverse filter which employs the entire shaping network in the feedback path may well exhibit modes of oscillation because of the characteristics of the shaping network and the several amplifiers required. Classical compensation techniques may be employed to stabilize the total inverse mechanization but the compensation networks may not be feasible considering the cost and space required. A practical method to solve the instability problem is to partition the system transfer function into one or more stable inverse functions which have a composite transfer function equal to the inverse of the desired system transfer function.

FIG. 4 is a partitioned inverse mechanization of a possible shaping network. The original shaping network is similar to the layout shown in FIG. 4 with the exception that filter 84 and resistor 80 are interchanged and filter 96 and filter 90 are interchanged. In FIG. 4 filters 84 and 96 may be simple notch filters and filter 90 may be a notch filter operating in conjunction with a gain changing element. The choice between using a stable total inverse mechanization and a partitioned inverse mechanization as in FIG. 4 is usually determined by cost and space considerations.

A monitor may be designed to "weight" the percentage output error as a function of frequency. An illustration of this may be seen in FIG. 5 where a filter 100 is placed in series with the input signal and the output error signal is derived by a summing means 105 which produces a frequency dependent difference signal between the input signal at 102 and the modified input signal at 104.

The composite limit monitor shown in FIG. 6 provides a warning output at logic output 146 when the system transfer function characteristics 121 deviate from the inverse characteristics of filter 123 or when the difference between the unweighted input signal on conductor 133 differs from the weighted signal on 131 which was modified by transfer function 130. If G(s), the weighting function, is a lag network, the difference between the lagged input signal and the input signal is indicative of the rate of change of the input 120. For instance, if the input at 120 is indicative of aircraft rate of turn, the error signal produced by summing means 130 is indicative of the rate of change of input rate. The error signal produced by summing means 132 is therefore indicative of input acceleration or "g-level".

In FIG. 7 the weighting function G(s) 165 is placed in series with the inverse notch filter 170 and the output 177 of the summing means 176 is a composite of the error due to the variation and characteristics of the control system 160 and the rate of change of the input signal at control system input 161. The composite error signal is amplified by the summing amplifier 180 and conducted to the lead-lag network 185 which serves to decrease the effect of amplifier offsets by transmitting the higher frequencies with considerably less attenuation than the DC signals. The modified error voltage from the filter 185 is measured by the positive and negative level detectors 187 and 188 and if the error voltage exceeds the level detector threshold, a signal is transmitted on conductor 189 or 190 producing an output from terminal 196 of the OR-gate 195. The output of the OR-gate 195 is connected to a lag network 197 which provides a time delay before a logic output is produced from the level detector 189.

FIG. 8 is a schematic of a preferred embodiment of an acceleration limit and inverse notch monitor. The condition control means 160' employs signal shaping using notch filters. The inverse filter 170' is a partitioned inverse mechanization of the characteristics of the condition control means 160'. The inverse mechanization of the combination of the notch filter 210 in series with the input of amplifier 230 which has a feedback resistance 232 is accomplished by placing a resistance 260 whose magnitude is identical to resistance 232 in series with the input of amplifier 280, and by providing a feedback circuit for amplifier 280 which contains a notch filter 282 having a transfer function identical to notch filter 210. Similarly the notch filter 240 in series with the input to the amplifier 241 is mechanized in the inverse notch filter as a feedback network 293 connected to amplifier 292. The bridged-T feedback network of amplifier 241 of the control means is modeled in the inverse filter 170 as a series filter 290 having characteristics identical to those of 245 and connected in series with amplifier 292. Resistor 246 in the feedback path of amplifier 241 of control means 160' is modeled in the inverse filter 170' as a resistor 291 in series with the input to amplifier 292. Thus the inverse filter 170' is mechanized basically by taking the mechanization of the control means 160' and interchanging the feedback and input circuitry. It is emphasized that considerable care must be used in assuring that filters 282, 290, and 293 have characteristics very nearly equal to the characteristics of filters 210, 245 and 240 respectively.

It is stated in the description of operation of FIG. 5 that a weighting function in cascade with one of the paths to the summing device and level detector will frequency or rate schedule the effective monitor trip level. The g-limit characteristics for the system of FIG. 8 may typically include constant g-limit for rate inputs from 0 to 8 Hz. with a first order decrease in sensitivity from 8 to 30 Hz. and a second order decrease in sensitivity for frequencies greater than 30 Hz. although it is obvious that different characteristics might be selected. The G(s) transfer function giving the constant g-limit and the first order decrease is a first order lag function as shown in filter 165'. Evaluation of the weighting function used as a g-limit disclosed an optimum placement of the G(s) transfer function as a tandem monitor similar to that shown in FIG. 6. This would prevent notch inverse phase errors from canceling the phase effects of G(s) if both are variables of the monitor error signal. The method illustrated in FIG. 6 eliminates possible masking of circuit failures. The weighting function is mechanized in FIG. 8 in series with the inverse notch characteristics in order to decrease the number of level detectors required in the overall mechanization. The switch 166' is provided so that the acceleration limit circuit may be disabled in order to test the effectiveness of the inverse notch monitor alone.

The input signal from 161' and the reconstructed and weighted input signal on conductor 175' are summed by amplifier 300 which provides an output which is equal to the difference of the two input signals. The output signal from amplifier 300 of the summing means 176' is passed through the filter 185' which has DC gain characteristics selected to sharply attenuate null offsets present in the monitor. The output of the filter 185' is connected to level detectors 187' and 188'. Each of these level detectors compares the error signal to an externally controlled voltage from the voltage divider 317 or 322 and provides a positive output voltage when the error signal exceeds the reference voltage programmed at the output of the voltage divider. Since there is no feedback from output to input of either amplifier 315 or 320, one amplifier will produce a large positive voltage as soon as the error signal exceeds the reference signal and a large step voltage will be passed through the OR-gate 195' to the lag filter 197'. Capacitor 342 of lag filter 197' provides a time delay after the level detector has sensed that the error signal is greater than the programmed reference. When the voltage across capacitor 342 exceeds the breakdown voltage of unijunction 350 the unijunction 350 turns on and fires SCR 360 which provides a logic indication at output 200 and drives a current through logic load 370. The indication at logic load 370 and logic output 200 will remain even after the error signal has returned to an in tolerance condition until SCR 360 is reset.

Although a preferred embodiment of the inverse monitor has been shown, it will be obvious to those skilled in the art that other variations and alterations may be made. I do not wish to be limited to the specification or the preferred embodiment as shown in the figures but only by the following claims.

I claim:

1. Apparatus of the class described comprising:
condition control means having a first transfer function and receiving an input signal representative of a control condition and producing an output in accordance with the first transfer function, said condition control means including at least one notch filter;
filter means having a second transfer function equal to the inverse of the first transfer function, receiving a signal indicative of the output of said condition control means and producing an output in accordance with the second transfer function; and
comparator means receiving the output of said filter means and the input signal to said condition control means, and providing an output indicative of the difference between the first transfer function and the second transfer function.

2. Apparatus of the class described in claim 1 and level detector means receiving the output of the comparator means and producing a logic indication when the output of the comparator means exceeds a predetermined level.

3. Apparatus of the class described, comprising:
condition control means having a first transfer function and receiving an input signal representative of a control condition and producing an output in accordance with the first transfer function;
first filter means having a second transfer function equal to the inverse of the first transfer function, receiving the output of said condition control means and producing an output in accordance with the second transfer function;
second filter means having a predetermined transfer function and receiving an input signal representative of the control condition and producing an output in accordance with the predetermined transfer function;
first comparator means receiving the output of said first filter means and the input signal to said condition control means, providing an output indicating the percentage change of the first transfer function;
second comparator means receiving the output of said second filter means and the input signal to said condition control means, said second comparator means providing an output equal to the difference between the input signal to said condition control means and the output signal of said second filter means; and
means receiving the output of said first comparator means and said second comparator means and producing a logic output when the output of said first comparator means or the output of said second comparator means exceeds a predetermined level.

4. Apparatus of the class described, comprising:
condition control means having a first transfer function and receiving an input signal representative of a controlled condition and producing an output in accordance with the first transfer function;
first filter means having a second transfer function equal to the inverse of the first transfer function, receiving the output of said condition control means and producing an output in accordance with the second transfer function;
second filter means having a third transfer function, receiving an input signal from the output of said first filter means and producing an output signal determined by the input signal and a third transfer function; and
comparator means receiving the output of said second filter means and the input signal to said condition control means, said comparator means providing an output equal to the difference between the input signal to said condition control means and the output of said second filter means.

5. Apparatus of the class described in claim 4 wherein the second filter means is a simple lag network causing the output of the comparator means to be indicative of the rate of change at the input signal and the percentage difference between the first and second transfer functions.

6. In a control system for a steerable craft, an acceleration limit and inverse filter monitor, comprising:
condition control means having a first transfer function and receiving an input signal indicative of the rate of turn of the craft, producing an output in accordance with the first transfer function and the input signal;
first filter means having a second transfer function equal to the inverse of the first transfer function, receiving the output of said condition control means and producing an output in accordance with said second transfer function;
second filter means having a third transfer function, receiving an input signal from the output of said second filter means and producing an output signal determined by the input signal and the third transfer function; and
comparator means receiving the output of said second filter means and the input signal to said condition control means providing an output indicative of the g-level and the performance of the condition control means.

7. Apparatus of the class described in claim 6 wherein the output of the comparator means is connected to a level detector and a warning output signal is transmitted when the output of said comparator means exceeds a predetermined level.

8. Apparatus of the class described in claim 7 wherein the second filter means is a simple lag network.

9. Apparatus of the class described in claim 8 wherein the condition control means incorporates at least one notch filter.

10. Apparatus of the class described, comprising:
condition control means having a first transfer function, receiving an input signal representative of a control condition and producing an output in accordance with the first transfer function;

filter means having a second transfer function equal to the inverse of the first transfer function, and having a simple lag third transfer function, said filter means receiving the output of said condition control means and producing an output primarily indicative of the input signal and the third transfer function; and comparator means receiving the output of said filter means and the input signal to said condition control means, said comparator means providing an output equal to the difference between the input signal to said condition control means and the output of said filter means.

* * * * *